Oct. 4, 1932.   J. A. WESTBROOK   1,880,613
DEMOUNTABLE TWO-PIECE AUTOMOBILE RIM
Filed Nov. 9, 1931
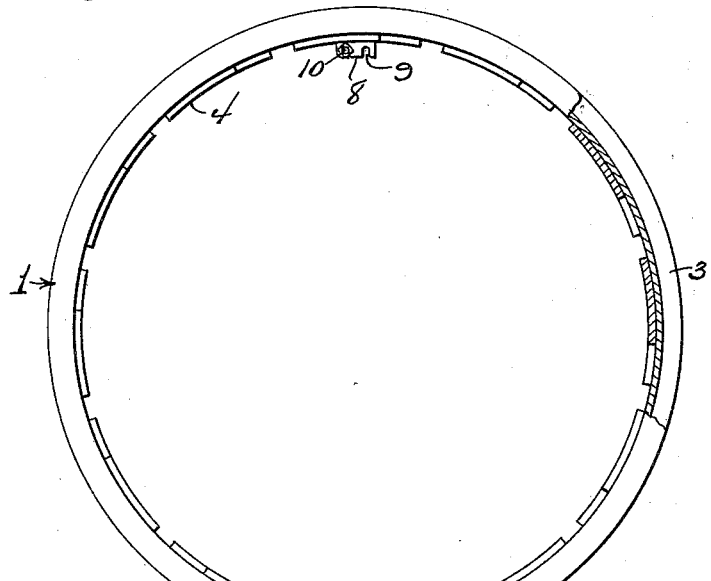
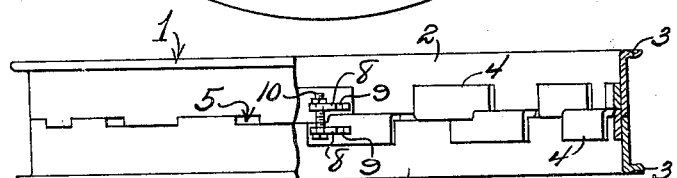
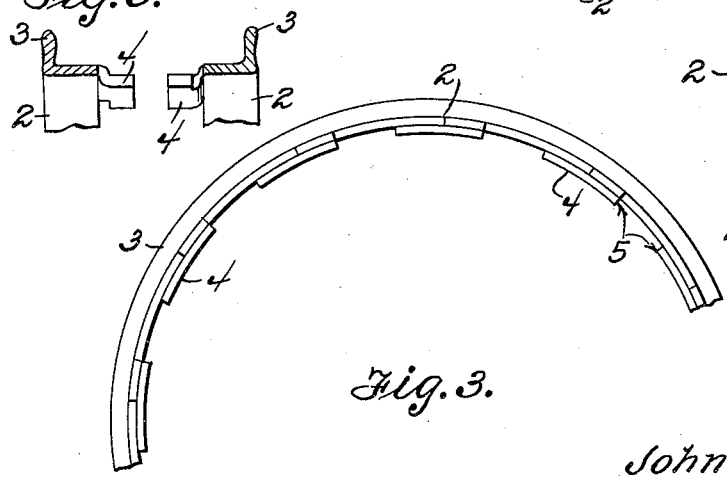
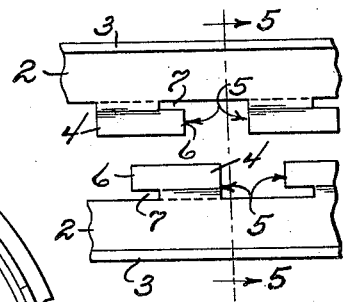
John A. Westbrook
INVENTOR
BY Victor J. Evans
and Geo. ATTORNEY Patented Oct. 4, 1932

1,880,613

UNITED STATES PATENT OFFICE

JOHN A. WESTBROOK, OF POWDER SPRINGS, GEORGIA

DEMOUNTABLE TWO PIECE AUTOMOBILE RIM

Application filed November 9, 1931. Serial No. 573,992.

This invention relates to demountable tire rims for motor vehicles of all types and has for the primary object, the provision of a device which will permit the mounting and removing of a tire therefrom with comparative ease and obviates the practice of collapsing or springing out of shape a rim in order to remove and replace a tire thereon and from actual experience has proven very undesirable due to the manual effort required for the operation and the cost of such rims and the short time in which they become unfit for further use.

Another object of this invention is the provision of a rim including companion annular separable sections whereby the rim may be easily and quickly separated and having means interlocking with each other for detachably securing said sections together with the tire thereon and further equipped with means for preventing the interlocking means from accidentally separating or detaching either when the rim is supporting a tire on a wheel or upon a tire rack.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a demountable two-piece automobile rim constructed in accordance with my invention.

Figure 2 is a plan view partly in section illustrating the same.

Figure 3 is a fragmentary side elevation illustrating one of the sections.

Figure 4 is an enlarged fragmentary plan view illustrating the sections separated and the interlocking means for each section.

Figure 5 is a transverse sectional view taken on the line 5—5 of Figure 4.

Referring in detail to the drawing, the numeral 1 indicates a rim of the demountable type and including companion annular sections 2 each having formed upon its outer edge a tire engaging flange 3. The sections 2 are adapted to be separated for the purpose of permitting a tire to be easily placed on or removed from the sections and when a tire is mounted upon the sections their inner edges are arranged in abutting engagement. Relatively spaced tongues 4 are formed on the inner edges of the sections 2 and provide notches 5 between the tongues. The tongues 4 are offset inwardly of the sections 2 and are cut away to form extensions 6 and slots 7 communicating with the notches 5. When the sections 2 are moved into engagement with each other as shown in Figure 2, the tongues of said sections are received within the notches 5 and by moving one of the sections circumferentially relative to the other section will cause the tongues to interlock and firmly secure the sections against separation. The tongues 4 being offset inwardly relative to the sections of the rim permits a tire to be easily placed on and removed from the sections when separated and also permits the inner edges of the sections to abut each other when the sections are secured together by the tongues providing a comparatively smooth seat for the tire to rest upon and will in no way injure the tire or pinch the inner tube thereof.

An ear 8 is formed on the inner face of each of the sections 2 and is provided with a notch 9 and an aperture 10. When the sections are joined together with a tire thereon, the apertures and notches 9 of the ears 8 align and a bolt or like fastener may be passed through the apertures to prevent one section from moving circumferentially relative to the other section. When the rim is mounted upon a wheel the usual lug bolt of the wheel fits within the aligned notches thereby preventing the rim from moving circumferentially relative to the wheel. When the rim is mounted upon a tire rack or the like and supporting an inflated tire, the bolt or like fastener 10 will prevent one section from moving circumferentially relative to the other section and thereby obviating any possibility of the interlocking tongues becoming separated and freeing the sections.

While I have shown and described the preferred embodiment of my invention, it will be understood that minor changes in construction, combination and arrangement of parts may be made without departing from the spirit and scope of my invention, as claimed.

Having thus described my invention, what I claim is:

A rim comprising companion annular sections adapted to be arranged in abutting engagement to support a tire, a plurality of relatively spaced flat tongues having offset portions formed integrally with the abutting edges of the sections to position said tongues inwardly of the sections, the tongues of one section fitting between the tongues of the other section, said offset portions having notches to permit the tongues to interlock with each other by the movement of one section circumferentially of the other section, an ear formed on one tongue of each section and having notches to receive a lug bolt of the wheel, and a fastener detachably connecting the ears.

In testimony whereof I affix my signature.

JOHN A. WESTBROOK.